Jan. 7, 1964   R. LUCE   3,117,254
TIMING CIRCUIT CONSISTING OF A RELAY AND OF
A PARALLEL-CONNECTED CAPACITOR
Filed March 9, 1959   3 Sheets-Sheet 1

INVENTOR.
R. LUCE
BY
ATTORNEY

Jan. 7, 1964  R. LUCE  3,117,254
TIMING CIRCUIT CONSISTING OF A RELAY AND OF
A PARALLEL-CONNECTED CAPACITOR
Filed March 9, 1959  3 Sheets-Sheet 3

INVENTOR.
R. LUCE
BY
ATTORNEY

United States Patent Office 3,117,254
Patented Jan. 7, 1964

3,117,254
TIMING CIRCUIT CONSISTING OF A RELAY AND OF A PARALLEL-CONNECTED CAPACITOR
Rudolf Luce, Essen, Germany, assignor to International Standard Electric Corporation, New York, N.Y., a corporation of Delaware
Filed Mar. 9, 1959, Ser. No. 798,027
Claims priority, application Germany Mar. 13, 1958
4 Claims. (Cl. 317—141)

In the telecommunication technique, e.g. in telephone systems, timing circuits are required for the various purposes serving the controlling and supervision. Timing circuits of these types mostly require a capacitor for achieving the desired time delays. Arrangements have already become known consisting of the combination of a capacitor and of a flow lamp. The capacitor is then charged across a charging resistor. As soon as the capacitor voltage has achieved the value corresponding to the striking potential of the parallel-connected glow lamp will be primed and the capacitor will suddenly discharge via the discharge gap of the glow lamp. Thereupon the charging process is started again from the current source available. The time which is required for the charging depends on the capacity of the employed capacitor, and upon the resistance value of the charging resistor, as well as upon the magnitude of the applied voltage. For obtaining constant charging times and, consequently, also constant switching times the operating voltage must be stabilized by means of special arrangements.

Other conventional types of timing circuits employ relays and capacitors for achieving the desired time delay. The capacitor and, in some cases, a resistor which is arranged in series therewith, are arranged in parallel with the relay winding. In this arrangement the relay has both an operating time delay and a releasing time delay. The time delay results from the capacity of the capacitor as well as from the resistance values of the capacitor circuit. Also in this circuit arrangement the time delay is dependent upon the magnitude of the initial current or upon the applied voltage respectively. If, the example, in the course of time there is changed the voltage of the supply battery, then there will also be caused a variation in time relating to the operation and the release of the relay.

The present invention relates to timing circuits of the last mentioned kind. The disadvantages of the conventional arrangement, residing in a dependency upon the operating voltage, are avoided by the invention in that the relay has a constant preenergization which is independent of the operating voltage, and of a value corresponding to respectively the operating or releasing energization of the relay, and in that in an additional winding of the relay this preenergization is permanently compensated by a counter energization produced by the operating voltage.

The following considerations are likewise applicable to the operating and relasing time-delay of relays comprising a capacitor connected in parallel with the operating winding.

Other objects and features of the invention will become apparent when the specification is read in conjunction with the drawings, comprising FIGS. 1 through 6 in which.

Figure 1:
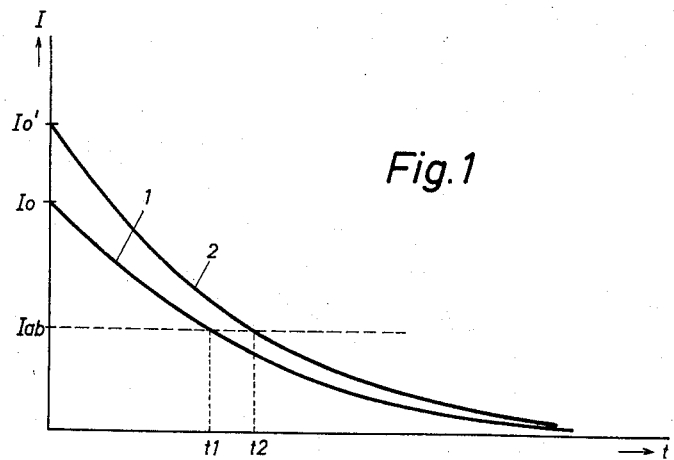
FIG. 1 shows the current versus time R.C. discharge curve for a conventional single winding relay.

In the following the invention will now be described in particular with reference to an example relating to the releasing time delay of a relay with a parallel-connected capacitor. It be assumed that the operating winding of the relay is energized by the operating voltage and that the capacitor is completely charged. If now the relay winding and the capacitor are disconnected from the operating voltage then the capacitor will be discharged via the operating winding of the relay. The time-constant $\tau$ for the discharge process is determined by the resistance values which are inserted into the discharge circuit, and by the capacity of the capacitor. As is well known this discharge current flowing through the relay winding has the course of an exponential function. As soon as the discharge current has died away to such as extent that there is reached the current intensity which is required for effecting the deenergization of the relay, the relay will drop back to normal. The time which has elapsed from the releasing of the energization circuit to the undercutting of the releasing current intensity, is the time delay as achieved by the circuit arrangement. However, it is also known that the value of the initial current at the capacitor discharge is dependent upon the voltage existing at the moment of the disconnection in the capacitor and, consequently, also upon the battery voltage. If, in the conventional types of circuit arrangements the battery voltage is increased for some reason or other, then there will also prevail a higher voltage between the plates of the capacitor. On account of this the value of the initial current during the capacitor discharge is likewise higher and, on account of this, the releasing value will only be reached later. Accordingly, in this case the relay has a longer time delay than in the normal operation. In the opposite case, of course, a reduction of the time delay will be caused by a voltage reduction. With reference to FIG. 1 there will now be described the conditions as existing in a conventional type of relay provided with a releasing time-delay due to a capacitor connected in parallel therewith. In this drawing $I_0$ indicates the current in the moment of disconnecting the relay. By way of a capacitor which is connected in parallel with the relay winding, the current decreases in accordance with an exponential function. By the reference $I_{ab}$ there is indicated that particular current value causing in the winding the energization which is just necessary for effecting the release of the relay. The time constant $\tau$ of the exponential function results in the conventional manner from the capacity of the capacitor and from the value of the resistance within the capacitor discharge circuit. As is indicated by the curve 1, the releasing energization is reached after the lapse of a time $t1$. The time between the disconnection of the relay and the time position $t1$ is termed the release time of the relay.

It be assumed now that, on account of a variation of the operating voltage, the current has the value $I_0'$ at the instant of disconnection. There will then be obtained the curve 2 and the current value $I_{ab}$ for releasing the relay will only be achieved at the time position $t2$. Accordingly, it will be seen that in the case of an increased operating voltage and, consequently, of an increased current, there will appear an increased time delay for the relay at the instant of disconnecting (deenergizing) the relay.

The above mentioned disadvantages are avoided by the present invention. The relay is provided in the conventional manner with an operate winding and, for achieving the time delay, with a parallel-connected capacitor. In addition thereto the relay has a constant pre-energization, which is independent of the operating voltage. The pre-energization is exactly adjusted to the value corresponding to the release energization. Preferably, and for the setting of this constant preenergization there is used an adjustable permanent magnet. The pre-energization can be provided otherwise by a further winding, in which case, however, this winding has to be supplied by a potential source other than the operating voltage source.

To the relay there is now applied a counter winding which is fed by the operation voltage. This counter winding serves to compensate the permanent pre-energization.

Figure 5:
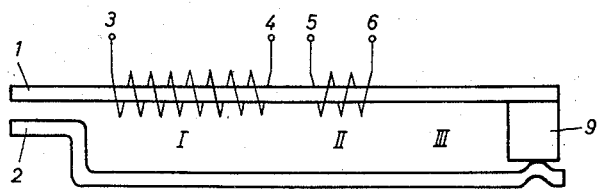
FIG. 5 shows one embodiment of the inventive relay having two windings and a permanent magnet.

Accordingly, the pre-energization and the counter energization continuously annul each other in the normal condition. In FIG. 5 there is denotatively shown a relay according to the invention. In this all component parts which are not absolutely necessary for understanding the invention, such as contacts, restoring spring for the armature, etc., have been omitted, and the remaining components have only been roughly denoted. Furthermore, it is also not shown in what way the permanent magnet can be exactly adjusted to the value of the release energization, because this is an arrangement actually known to the one skilled in the art.

In FIG. 5 reference 1 indicates the core of the relay. By reference 2 there is indicated the moving armature. On this core there is mounted the winding I with the connecting terminals 3 and 4. This winding alone effects the operation of the relay, because its opposing winding II with the connecting terminals 5 and 6 only serves to completely compensate the pre-energization caused by the permanent magnet 9.

Figure 5A:
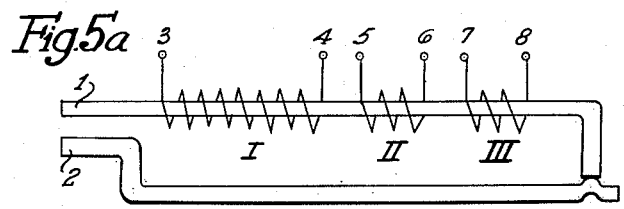
FIG. 5a shows the relay of FIG. 5 with a third winding substituted for the noted permanent magnet.

FIG. 5a shows the relay structure of FIG. 5 with a winding III shown in lieu of the permanent magnet 9 of FIG. 5. This winding III is used for generating the necessary pre-energization which was previously provided by the permanent magnet. Winding III is not connected to the same source of voltage as windings I and II but rather is connected to a special voltage source.

Figure 6:
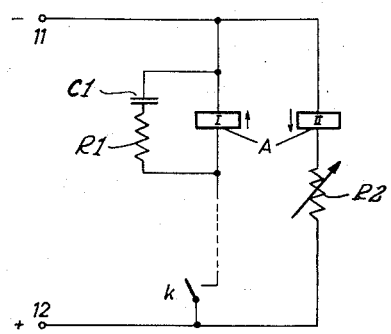
FIG. 6 shows a circuit diagram of the interconnection of the windings of the relay.

In FIG. 6 there is shown a possibility as to how the windings of the relay can be connected. By the arrows shown besides the individual windings there is indicated the sense of direction of the energization caused by the particular winding. The windings I and II of relay A are connected to the terminals 11 and 12 of the source of operating voltage. In parallel with the winding I there is connected in the conventional way a capacitor C1 and resistance R1. By the contact $k$ there is effected the actuation of the relay A. The opposing winding II is permanently applied to the source of operating voltage appearing on terminals 11 and 12. By means of a series resistance R2, or the like, the energization of this winding is so adjusted that it, in the case of normal voltage, will compensate the pre-energization as caused by the permanent magnet.

When considering now the current curve as resulting upon disconnection of the relay there will be seen that there is at first no change with respect to the above mentioned conventional types of arrangements, because the two additional energizations "pre-energization" and "counter energization" annul each other.

Figure 2:
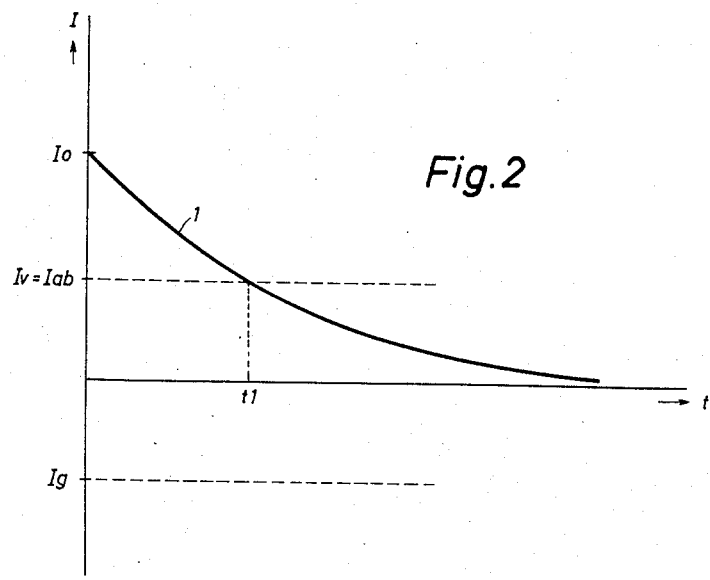
FIG. 2 shows the discharge curve of the condenser delayed relay of the invention under normal voltage conditions.

Both energizations are permanently effective independently of the switching condition of the relay. For both the energization and deenergization of the relay there is exclusively used the winding I. Accordingly, the relay has the same mode of operation as the conventional type of relay arrangement as mentioned above. In FIG. 2 there is plotted the current curve subsequently to the disconnection with respect to the inventive arrangement at normal voltage conditions. The initial value of the current again amounts to $I_0$, as in FIG. 1. By the permanent magnet (or by an additional winding) there is provided a pre-energization corresponding to the energization necessary for effecting the deenergization of the relay. In FIG. 2 this is denoted by $I_{ab}=I_v$. Since at the same time there exists a counter energization with a current $I_g$, the current curve 1 extends in the same way as in FIG. 1. At the time position $t1$ the current value has fallen below the value necessary for deenergizing the relay ($I_{ab}$).

In the following there will now be described the behavior of the inventive arrangement upon appearance of operating voltage variations. If the operating voltage is varied in an unwanted manner then the arrangement will naturally remain constant due to the action of the permanent magnet (or of a separately supplied winding). However, as already outlined in the foregoing, the initial value of the discharge circuit of the capacitor is changed from $I_0$ to $I_0'$. Since also the counter energization is dependent upon the operating voltage, in the circuit of the opposite winding there will also result a change or variation of current from $I_g$ to $I_g'$. On account of this the curve of the discharge current with respect to time will suffer such a displacement that the releasing value will be reached after same time as if there had appeared no voltage variation. By the variation of the operating voltage the counter energization will always be increased or decreased to such a strong extent that by it there will be compensated the displacement as caused by the increase or decrease of the exciting current in the operating winding, that is, also of the initial value of the discharge current, and the time delay will remain constant, irrespectively of the kind of variation of the operating voltage.

Figure 3:
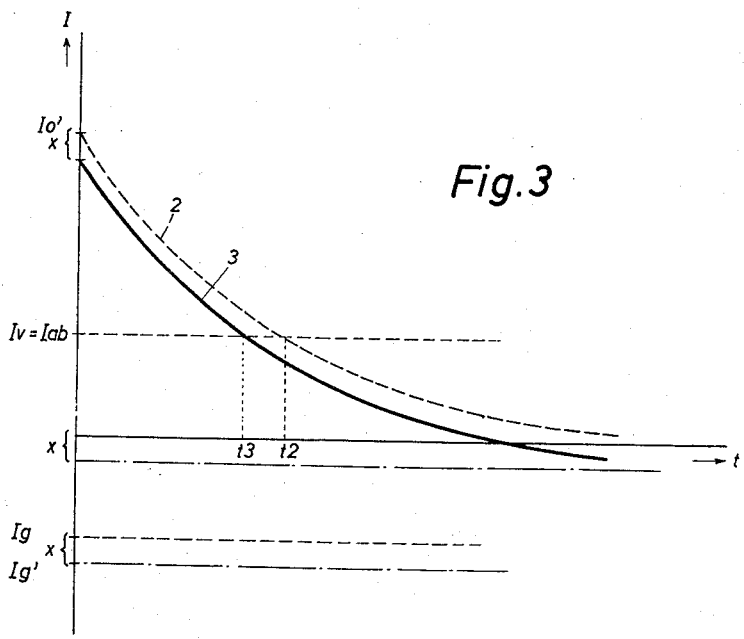
FIG. 3 shows discharge curves of the relay of FIG. 2 under normal voltage conditions and under variations from the normal.

With reference to FIG. 3 there will now be described in particular the conditions as existing in the case of voltage variations. Alterations of the operating voltage cause an alteration of the initial current value from $I_0$ towards $I_0'$. Accordingly, also in the circuit of the opposing winding there will result a current alteration from $I_g$ towards $I_g'$. The changed value $I_g'$ is shown in FIG. 3 by the dot-and-dash line, and is displaced in the system of coordinates by the amount $x$ compared with the value $I_g$ indicated by the broken line. The superimposing of the energization $I_g'$ and $I_v$ will then no longer result in a compensation, but in a displacement of the zero line likewise by the amount $x$. This line is likewise indicated by a dot-and-dash line. When assuming now the same conditions to exist as has been described hereinbefore under $a$ in FIG. 1 with reference to the curve 2, then the entire curve 2 will now be shifted by the amount $x$. The thus obtained new curve 3 falls below the release value $I_{ab}$ at the time position $t3$.

Figure 4:
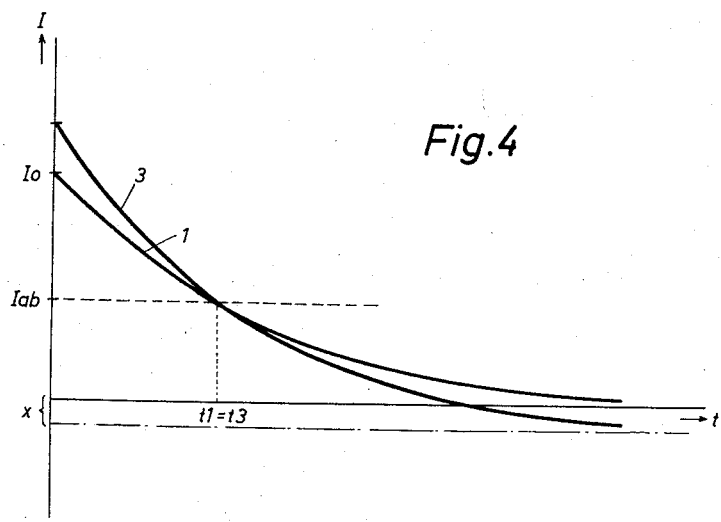
FIG. 4 shows the discharge curves of the FIGS. 1 and 3 plotted together.

In FIG. 4 the curves 1 and 3 from FIG. 1 or 3 respectively are plotted over one another. From this representation it will be seen that in both cases the curves fall below the release value $I_{ab}$ at the same time position, in other words, the releasing time $t1$ for the curve 1 is equal to the releasing time $t3$ for the curve 3. The fact that these two time positions really are equal to each other is proved by the following calculation.

Calculation

For the calculation there have been chosen the following notations:

$U_0$ — Normal operating voltage.
$\Delta U$ — Voltage variation.
$R_0$ — Total resistance of the circuit for winding I of the relay.
$R_g$ — Total resistance of the circuit of the opposing winding II of the relay.
$I_0 = \dfrac{U_0}{R_0}$ — Initial current value at the disconnection of the relay.
$I_0' = \dfrac{U_0 + \Delta U}{R_0}$ — Initial current value of the relay in the event of voltage variations.
$I_{ab}$ — Releasing current value of the relay.
$I_v = I_{ab}$ — Pre-energizing current (as adjusted by winding III or permanent magnet).
$I_g = \dfrac{U_0}{R_g}$ — Current flowing through the opposing winding II.
$I_g' = \dfrac{U_0 + \Delta U}{R_g}$ — Current flows through the opposing winding II in the event of voltage variationing.
$\tau$ — Time constant of the time-delay circuit (capacitor discharge circuit).

Curve 1

$$\frac{U_0}{R_0} e^{\frac{-t1}{\tau}} + I_v - \frac{U_0}{R_g} = I_{ab}$$

Since according to conditions $I_v = I_{ab}$, there will result:

$$\frac{U_0}{R_0} e^{\frac{-t1}{\tau}} = \frac{U_0}{R_g}$$

From this there is calculated $$e^{\frac{-t1}{\tau}} = \frac{U_0 \cdot R_0}{R_g \cdot U_0} = \frac{R_0}{R_g}$$

$$e^{\frac{+t1}{\tau}} = \frac{R_g}{R_0}$$

$$\frac{t1}{\tau} = \ln \frac{R_g}{R_0}$$

$$t1 = \tau \cdot \ln \frac{R_g}{R_0}$$

Curve 3

$$\frac{U_0 + \Delta U}{R_0} e^{\frac{-t3}{\tau}} + I_v - \frac{U_0 + \Delta U}{R_g} = I_{ab}$$

Since according to conditions $I_v = I_{ab}$, there will result:

$$\frac{U_0 + \Delta U}{R_0} e^{\frac{-t3}{\tau}} = \frac{U_0 + \Delta U}{R_g}$$

$$e^{\frac{-t3}{\tau}} = \frac{(U_0 + \Delta U) R_0}{R_g (U_0 + \Delta U)} = \frac{R_0}{R_g}$$

$$e^{\frac{+t3}{\tau}} = \frac{R_g}{R_0}$$

$$t3 = \tau \cdot \ln \frac{R_g}{R_0}$$

As will be seen from the calculation, the release times $t1$ and $t3$ are equal to one another, that is, also in the case of variations of the operating voltage the releasing time of the relay will remain constant. As has already been mentioned several times hereinbefore it is possible, of course, to achieve instead of the releasing time, also a keeping constant of the operating time.

The arrangement still bears a further advantage. The counter energization as derived from the operating voltage can be made adjustable in such a way that it can assume a value deviating from its rated value, so that the pre-energization can be subjected to an over- or undercompensation. In this way it will be possible to selectively adapt the time delay of the relay within wide limits and without any difficulties to the given requirements, and to make it adjustable. If, by means of such an arrangement, there has once been achieved a certain time delay with respect to a relay, then this time will remain constant even if, as mentioned hereinbefore the operating voltage is subjected to fluctuations or variations.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a timing circuit, an electromagnetic relay having a first winding and a second winding connected in parallel and in flux-opposing relation, an RC time-constant network connected in parallel with said first winding, a first power source and means for connecting it to said windings and said network, an adjustable flux source associated with said relay, said flux source being independent of said first power source, and arranged in flux aiding relation with the said first winding, means for adjusting the magnetomotive force of said flux source equal to the maximum magnetomotive force which permits the relay to release, and means for adjusting the magnetomotive force generated by said second winding to a value equal to the said maximum magnetomotive force to maintain the release time characteristics of said relay independent of any variations in said first power source.

2. A timing circuit as set forth in claim 1 wherein the said means for adjusting the magnetomotive force of the said second winding is varied to provide any one of a number of release time intervals.

3. A timing circuit as set forth in claim 1 wherein said flux source comprises a third winding on said relay energized by a power source separate from said first power source.

4. A timing circuit as set forth in claim 1 wherein said flux source comprises a permanent magnet.

References Cited in the file of this patent

UNITED STATES PATENTS

| | | |
|---|---|---|
| 2,034,881 | Scheer | Mar. 24, 1936 |
| 2,236,981 | Winter | Apr. 1, 1941 |
| 2,436,787 | Bray | Mar. 2, 1948 |
| 2,437,756 | Rosing | Mar. 16, 1948 |
| 2,892,954 | Orlando | June 30, 1959 |